Jan. 16, 1962     R. E. N. OXSPRING ET AL     3,016,810
ROTARY CAMERA SHUTTER
Filed Oct. 25, 1957     10 Sheets-Sheet 1

Ronald E. N. Oxspring
Philip Rosenblum
INVENTORS

BY
*Forrest J. Lilly*
ATTORNEY

Jan. 16, 1962  R. E. N. OXSPRING ET AL  3,016,810
ROTARY CAMERA SHUTTER

Filed Oct. 25, 1957  10 Sheets-Sheet 2

Ronald E. N. Oxspring
Philip Rosenblum
INVENTORS

BY
ATTORNEY

Jan. 16, 1962  R. E. N. OXSPRING ET AL  3,016,810
ROTARY CAMERA SHUTTER

Filed Oct. 25, 1957  10 Sheets-Sheet 3

FIG. 5

Ronald E. N. Oxspring
Philip Rosenblum
INVENTORS

BY

ATTORNEY

Ronald E. N. Oxspring
Philip Rosenblum
INVENTORS

ATTORNEY

FIG. 9

Jan. 16, 1962 R. E. N. OXSPRING ET AL 3,016,810
ROTARY CAMERA SHUTTER
Filed Oct. 25, 1957 10 Sheets-Sheet 8

Ronald E. N. Oxspring
Philip Rosenblum
INVENTORS

BY
ATTORNEY

FIG. 12

Ronald E. N. Oxspring
Philip Rosenblum
INVENTORS

Jan. 16, 1962 R. E. N. OXSPRING ET AL 3,016,810
ROTARY CAMERA SHUTTER
Filed Oct. 25, 1957 10 Sheets-Sheet 10

Ronald E. N. Oxspring
Philip Rosenblum
INVENTORS

BY
ATTORNEY

United States Patent Office 3,016,810
Patented Jan. 16, 1962

3,016,810
ROTARY CAMERA SHUTTER
Ronald Ernest N. Oxspring, Los Angeles, and Philip Rosenblum, Sierra Madre, Calif., assignors to Hycon Mfg. Company, Pasadena, Calif., a corporation of Delaware
Filed Oct. 25, 1957, Ser. No. 692,444
11 Claims. (Cl. 95—10)

Our invention relates generally to camera shutters and more particularly to a focal plane shutter of the continually rotating type.

Focal plane shutters are commonly of the curtain type wherein the curtain includes a slit which is swept, by motion of the curtain, across the surface of the film normally located directly behind the curtain, exposing the film. Focal plane shutters generally are capable of much higher effective shutter speeds since film exposure time is proportional to the slit width and the slit velocity across the film. A between-the-lens shutter is dependent upon the total time required to open the whole lens aperture and to close off the light completely. It can be seen that much less time is required to sweep a slit across a discrete grain of emulsion as in a focal plane shutter. Thus, focal plane shutters produce exceptionally little point image degradation in a photograph which is due to image motion resulting from relative motion between camera and photographed object or area. This degradation occurs, for example, when the camera is operated in a moving vehicle such as a high speed aircraft in photographing the terrain below. The point image degradation is reduced because the slit exposes an incremental area of film at any instant, and is correspondingly much less. The slit can usually be varied in width and the curtain speed can be adjusted to meet picture conditions such as brightness and object motion.

The curtain type of focal plane shutter requires rapid starts and stops in exposure operations, however. This causes a good deal of reaction shock which is severe in large cameras and materially affects the life of the shutter. Long focal length lenses mounted in curtain type focal plane shutter cameras are particularly susceptible to this shock. Of course, focal plane shutters can provide high shutter speeds not easily obtainable in other types of shutters.

It is an object of our invention to provide a shutter mechanism which has extremely little reaction shock in a shutter operation.

Another object of our invention is to provide a high speed shutter, and one in which shutter speeds can be easily varied.

Another object of the invention is to provide a focal plane shutter in which an infinitely adjustable slit width can be obtained over a wide range.

A further object of our invention is to provide a focal plane shutter wherein slit width is automatically adjusted according to light conditions of the object or area being photographed.

A still further object of this invention is to provide a shutter which can be operated in response to a signal pulse and which does not permit double exposures over the pulse duration.

Briefly, we prefer to accomplish the foregoing and other objects by providing a focal plane shutter including a continually rotated disc having a sector cut therein and a movable butterfly blade which is rotated with the disc and normally covers the sector cut. The disc can be driven at any desired constant speed through a large shutter disc idler gear and a differential gear train including four gears mounted in a quadrilateral arrangement with one gear at each corner is provided to drive the butterfly blade in synchronism with the disc through a large butterfly blade idler gear. The quadrilateral differential gear arrangement can be modified by compressing and expanding the diagonal axes of the quadrilateral to change the position of the butterfly blade over the sector cut to provide a slit for scanning (sweeping) an aperture to expose film suitably disposed beyond the aperture. The slit is opened, when an exposure is desired, to sweep the aperture and then closed in a single rotation of the disc, and the shutter is ready for another exposure operaton if required. Means are provided to control the slit width that is obtained for an exposure according to the brightness of the object or area to be photographed, and a control circuit which includes a commutator and relays prevents double exposure.

Our invention possesses numerous other objects and features, some of which together with the foregoing, will be set forth in the following detailed description of a preferred embodiment of our invention, and the invention will be more fully understood by reading the description with joint reference to the attached drawings, in which.

Figure 1:
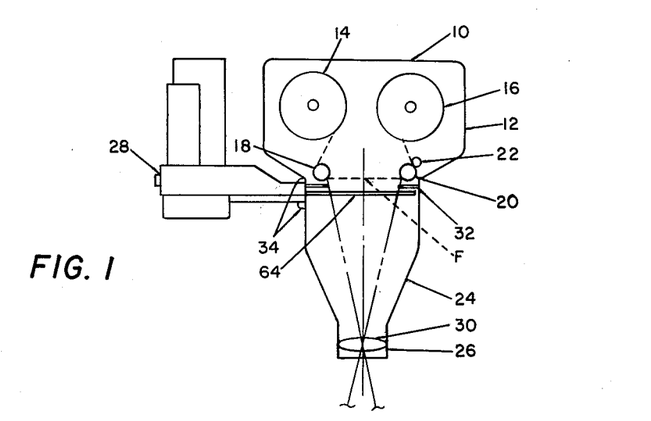
FIGURE 1 is a simplified drawing of a camera employing a shutter and control system according to our invention.

An aerial camera 10, for example, employing a shutter according to our invention is diagrammatically illustrated in FIGURE 1. The camera 10 is generally conventional, having a magazine section 12 containing a supply spool 14, takeup spool 16, guide roller 18, metering roller 20, and a pressure roller 22. Film is indicated by the broken line F. A lens cone 24 couples lens section 26 to the magazine section 12. Shutter 28 is positioned between lens 30 and diaphragm 32 such that the shutter disc lies in the focal plane of lens 30. Lens 30 is used to focus an image onto film F as exposed by the shutter disc rotating in the focal plane adjacent to film F. Thus, the shutter 28 functions as a focal plane shutter, in this example. It is obvious, however, that the shutter 28 can be adapted for use as an ordinary between-the-lens shutter.

The shutter 28 is fastened to the lens cone 24 with the shutter disc inserted into a slot cut in the wall of lens cone 24, in a plane perpendicular to the wall and common axis of the lens 30. Clamps 34 engage the body of the shutter 28, holding the shutter disc perpendicular to the common axis of the lens 30. A light tight connection is obtained at the juncture of shutter 28 and lens cone 24. The shutter disc serves a substantially square aperture having slightly rounded corners in diaphragm 32.

The clamps 34 engage with pins 36 which are positioned laterally across slots 38 in upper and lower housing sections 40 and 42, respectively, to hold shutter 28 to the lens cone 24. These pins 36 and slots 38 are clearly shown in FIGURES 2, 3 and 4 which are respectively a top plan view, side elevation view along the line 3—3 in FIGURE 2, and bottom plan view of the shutter 28. In FIGURE 4, cover plate 44 (see FIGURE 3) has been removed to show internal structure.

Figure 2:
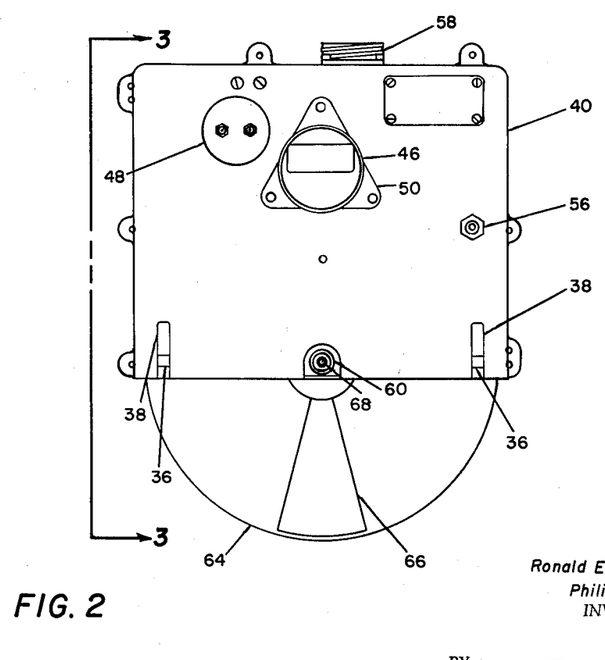
FIGURE 2 is a top plan view of a shutter of preferred construction.
Figure 3:
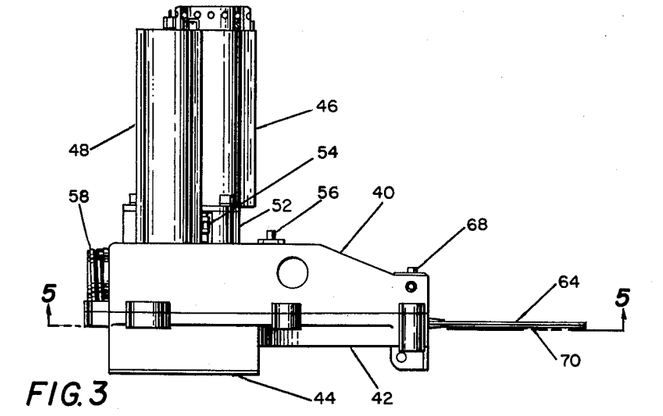
FIGURE 3 is a side elevation view of the shutter of FIGURE 2.
Figure 4:
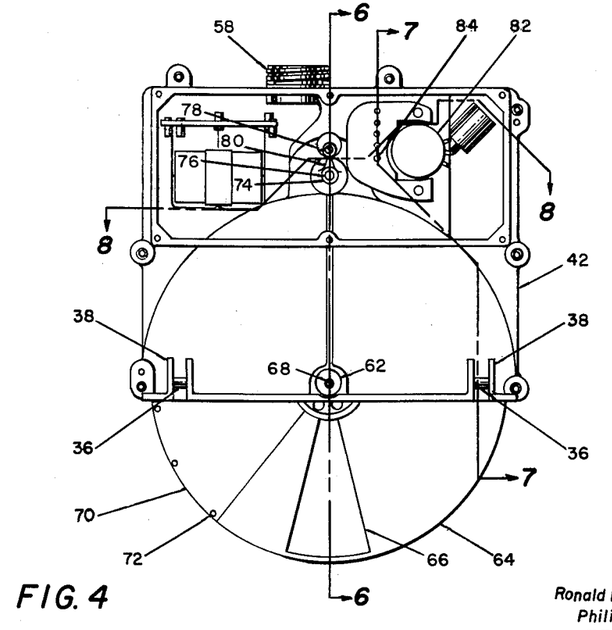
FIGURE 4 is a bottom view of the shutter of FIGURE 2.

The exterior appearance of a preferred embodiment of our invention is illustrated by FIGURES 2, 3 and 4. Referring to these three figures, the shutter 28 is seen to comprise a generally rectangular housing formed from the normally upper and lower housing sections 40 and 42 which are fastened together by screws suitably spaced around the sides of the upper and lower housing sections 40 and 42 through protruding flanges as shown. The upper housing section 40 mounts a normally constant speed A.C. motor 46 and a D.C. motor 48. The A.C. motor 46 is attached to a triangular base plate 50 which is, in turn, supported by three protuberant cylindrical bases 52 triangularly spaced on the upper housing section 40. The three protuberant bases 52 can be part of the upper housing casting and the base plate 50 is fastened at each corner by screws to the protuberant bases 52. The output shaft of the A.C. motor 46 drives the shutter mechanism through in-line coupling 54. A pushbutton switch 56 is also mounted on the upper housing section 40, and an electrical receptacle 58 extends from the back end.

The upper housing casting 40 is drilled to accommodate a bearing 60 press-fitted in the hole. Similarly, a corresponding hole is drilled in the lower housing casting 42 to accept bearing 62 also press-fitted in the corresponding hole. A shutter disc 64 having a 30 degree sector cut 66 is rotatably mounted on an axle shaft 68 for free rotation, the axle shaft 68 being additionally journalled in the bearings 60 and 62 respectively at each end. A butterfly blade 70 including a sector shaped cover vane is affixed to axle shaft 68 to rotate integrally therewith. The butterfly blade 70 has been moved aside to an abnormal position in FIGURE 4 to show the sector cut 66 more clearly. The butterfly blade 70 is closely spaced axially to the shutter disc 64 and is separated from direct contact by small nylon buttons 72 affixed near the periphery of the butterfly blade riding on the surface, near the edge, of the shutter disc 64. The cover vane of butterfly blade 70 is normally used to cover the 30 degree sector cut 66 and can be moved with respect to the cut 66 to provide an adjustable width slit for sweeping across the aperture in diaphragm 32 and exposing the film F.

The lower housing section 42 includes a rectangular box frame section which is normally covered by cover plate 44. This cover plate 44 has been deleted in FIGURE 4 to reveal the position, in plan view, of a commutator 74 which is axially aligned with and mounted on a shaft 76 driven by the A.C. motor 46 through the coupling 54. A brush assembly 78 is mounted near the commutator 74 such that the axis of the brush assembly body is parallel to the axis of commutator 74 and wire brushes 80 ride firmly against the side of the cylindrically shaped commutator 74. A flat disc commutator for compactness can, of course, be used instead. The shaft mounting the commutator 74 rotates in a bearing 166 press-fitted in lower housing section 42 directly over the commutator 74. The brush assembly 78, however, is rigidly fastened to the lower housing section 42 by means of a screw passing through an axial hole in the center of the brush assembly's cylindrically shaped body. A potentiometer 82 is mounted on the lower housing section 42 to one side within the box frame section as are commutator 74 and brush assembly 78. The potentiometer 82 can be adjusted in wiper position by the D.C. motor 48 which couples with the wiper shaft of the potentiometer 82. A thermal board 84 is located beside the potentiometer 82 to facilitate electrical connections with commutator 74 leads.

Figure 5:
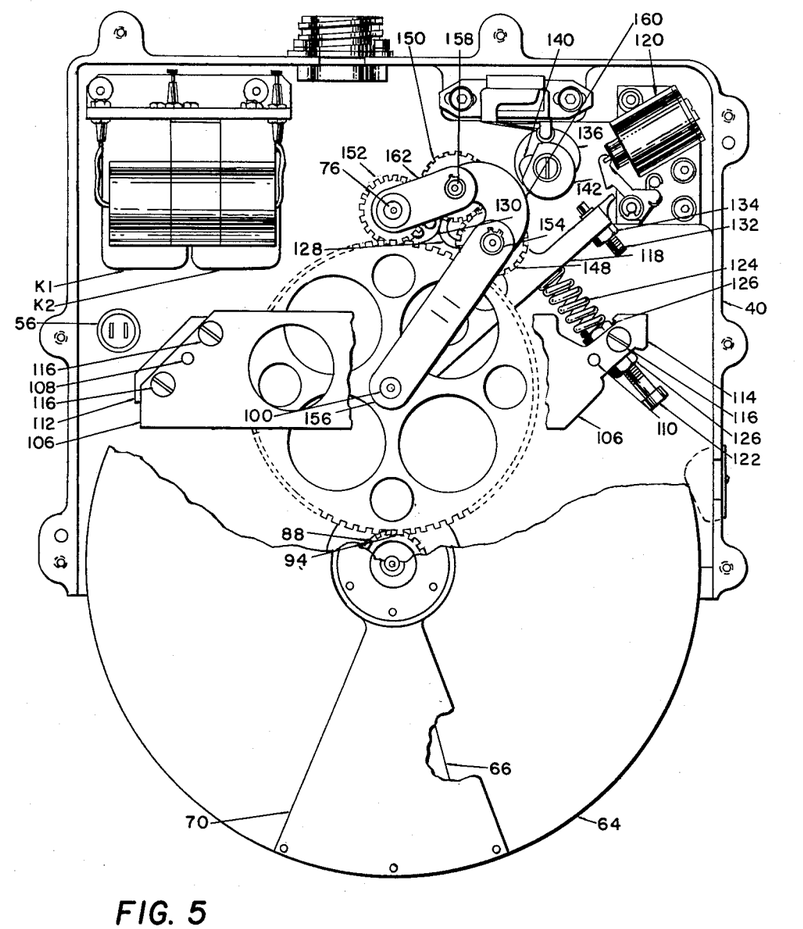
FIGURE 5 is a sectional view taken along the line 5—5 as shown in FIGURE 3.
Figure 6:
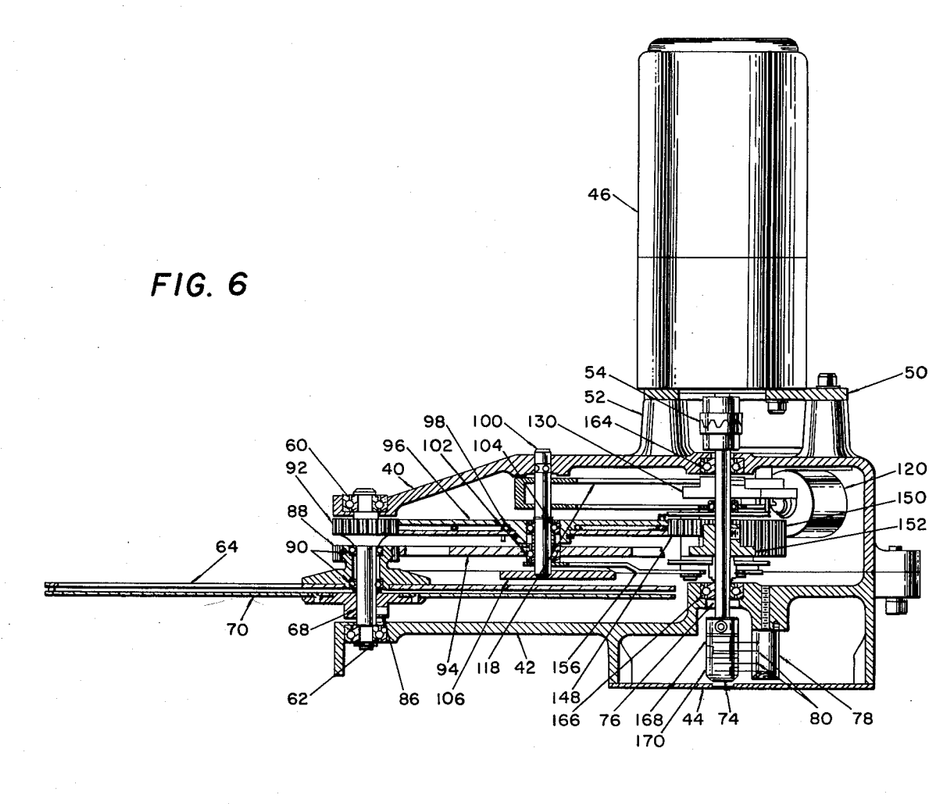
FIGURES 6, 7 and 8 are sectional views of the shutter shown in FIGURE 4, taken along the lines 6—6, 7—7, and 8—8, respectively.
Figure 7:
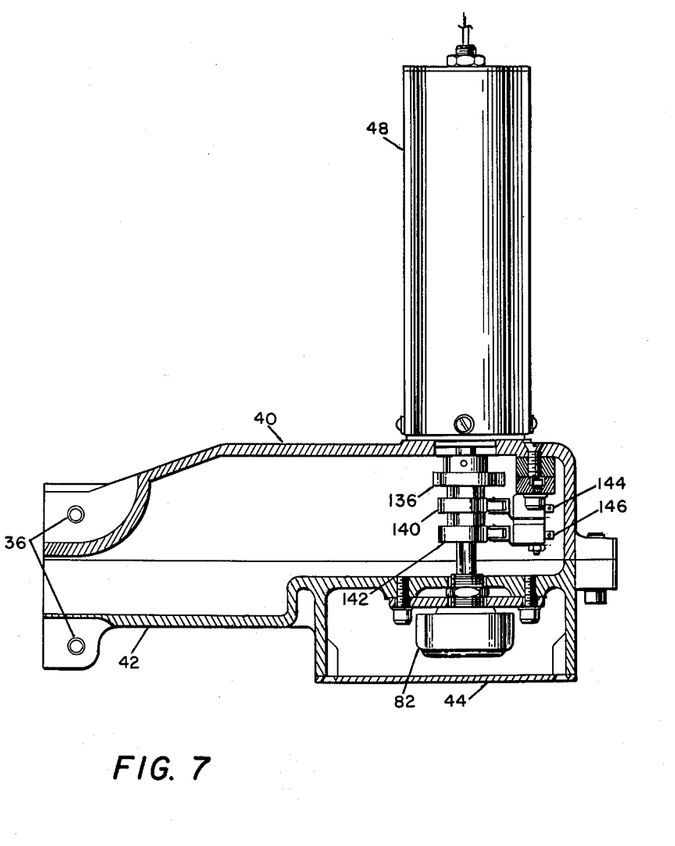
Figure 8:
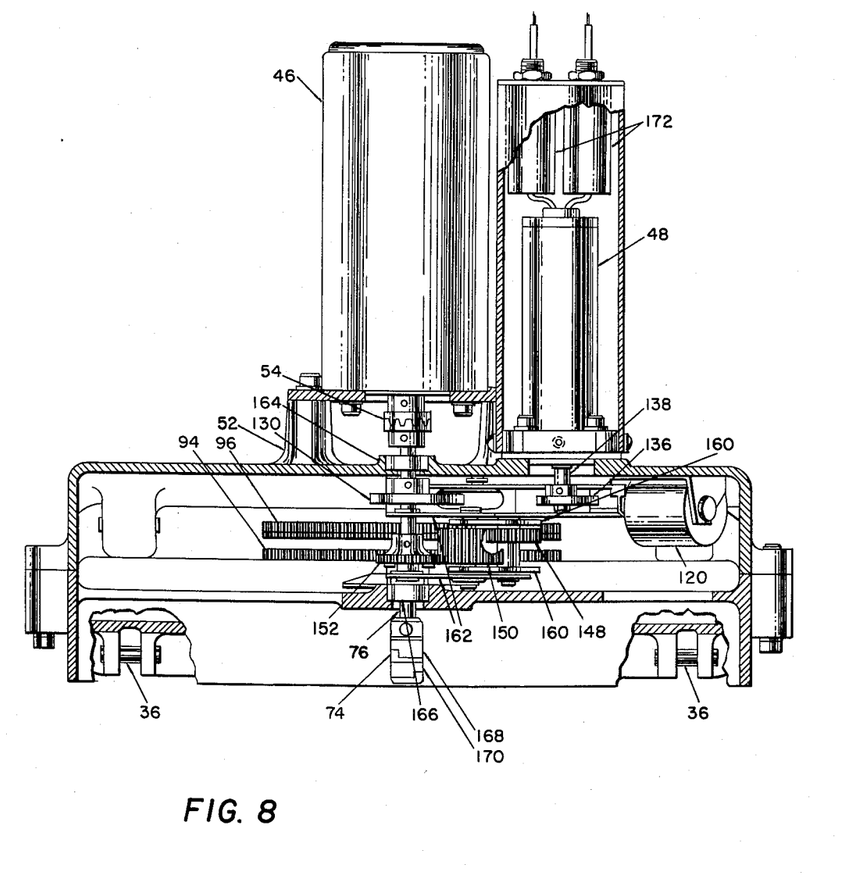

Detailed illustration of the preferred embodiment of our invention is provided by FIGURES 5, 6, 7 and 8 which are views obtained when taken respectively along lines 5—5 in FIGURE 3, lines 6—6, 7—7 and 8—8 in FIGURE 4. The view provided by FIGURE 5 is simply that of the bottom view of the upper housing section 40, the lower housing section 42 being removed and the shutter disc 64 and butterfly blade 70 partially broken away to show the shutter drive mechanism. The shutter disc 64 having the 30 degree sector cut 66 when at bottom center as shown in FIGURE 5 is normally covered by the cover vane of butterfly blade 70 equally centered over the 30 degree sector cut 66. The butterfly blade 70 is rigidly secured to axle shaft 68 by a pair of set screws, like set screw 86, positioned at right angles in the hub of the blade 70 (FIGURE 6). The shutter disc 64 has rigidly affixed to its hub a gear 88, and the hub and gear 88 are mounted for rotation on axle shaft 68 on a set of bearings 90. Just above gear 88 is positioned another gear 92 which is integral with axle shaft 68. Rotation of gear 88 independently turns the shutter disc 64 about axle shaft 68, and rotation of gear 92 turns the butterfly blade 70 and axle shaft 68.

The shutter disc gear 88 meshes with a large idler gear 94 and the butterfly blade gear 92 meshes with a large, split idler gear 96 which is conventionally composed of two adjacent gears, independently rotatable but coupled together by a spring 98 to eliminate backlash, the spring-coupled gears acting as one. Shutter disc idler gear 94 and butterfly blade idler gear 96 are rotatably carried on a fixed axle shaft 100 on independent bearings 102 and 104, respectively. The axle shaft 100 is driven into a drill hole in casting 40 on one end, and the other end is pressed into a drill hole in an overlying bracket member 106 which is a metal strip positioned on dowel pins 108 and 110 respectively set in upright bases 112 and 114 protruding directly from and which are part of the upper housing casting 40. The overlying bracket strip 106 is secured to the bases 112 and 114 by screws 116.

Also rotatably mounted on the fixed axle shaft 100, on one end, is a spring loaded lever arm 118, the other end of which cooperates with a solenoid latch 120. Spring tension can be adjusted by moving an adjustment screw 122 passing through the base 114, in or out to vary the compression of spring 124 which is braced between the lever arm 118 and the base 114. Screw 122 can be locked in place by tightening nuts 126. A roller bearing 128 is carried about midway on the lever arm 118 and cooperates with harmonic cam 130 which is secured to shaft 76 to rotate therewith to produce harmonic motion. The harmonic cam 130 works against the roller bearing 128 each revolution to restore lever arm 118 to a latched position or to rock the lever arm 118 on its pivot axle 100, momentarily raising the end of the lever arm 118 a little off the catch of the solenoid latch 120, when latched.

A set screw 132 is threaded through the body of lever arm 118 near the latching end and can be adjusted in position by a lock nut 134, so that the distance between the tip of the set screw 132 and the working surface of a slit width control cam 136 can be adjustable. The slit width control cam 136 is a linear cam mounted and secured to the output shaft 138 of the D.C. motor 48 as can be clearly seen in FIGURES 7 and 8. The output shaft 138 also mounts and drives two control cams 140 and 142 which cooperate respectively with limit switches 144 and 146. The cams 140 and 142 are round discs each having a flat portion ground on it. Finally, the output shaft 138 is coupled to drive the wiper of the potentiometer 82, as stated previously above. Thus, the linear cam 136, control cams 140 and 142, and the wiper of potentiometer 82 can be adjusted in position by the D.C. motor 48. It should be noted that the terminal board 84 and solenoid latch 120 were omitted from FIGURE 7 for clarity of illustration, and, similarly, the potentiometer 82 and control cams 140 and 142 were omitted from FIGURE 8 for the same reason.

The large butterfly blade idler gear 96 meshes with a gear 148 which, in turn, meshes with the upper half of a wide gear 150, the lower half of which meshes with gear 152. Gear 152, in turn, meshes with the large shutter disc idler gear 94. The gear 152 is mounted and secured to the drive shaft 76 driven by the A.C. motor 46. The gear 148 is rotatably mounted through bearings on a shaft 154 which is journalled at the ends respectively in the body of lever arm 118 and in one end of a radius arm 156, the other end of which is rotatably carried by the fixed axle shaft 100. The gear 148 is thus constrained to mesh with the large butterfly blade idler gear 96 and can be revolved about the axis of shaft 100 on the supporting arms 118 and 156. The ends of the axle shaft 158 of the wide gear 150 are rotatably supported and carried at the common juncture of two sets of connecting links 160 and 162 which bracket and connect gear 148 to wide gear 150, and gear 152 to the wide gear 150. The arcuate connecting links 160 and the straight connecting links 162 join at the ends of axle shaft 158 on both sides of the gears 150, and all three gear axles 76, 154 and 158 are free to rotate in the bracketing link connections. Thus, movement of gear 148 due to any angular movement of lever arm 118 and radius arm 156 about the axis of fixed axle shaft 100 causes the wide gear 150 to shift angularly in position on the links 162. The floating gear 150, however, is constrained to mesh continually with both gears 148 and 152. It is noted that the relatively long output shaft 76 is supported at two places by bearings 164 and 166, commutator 74 being secured to the end of the output shaft 76. Four sets of wire brushes 80 (FIGURE 6) ride on two slip rings 168 and 170, two sets to a slip ring.

The drive gear 152 secured to the output shaft 76 of the A.C. drive motor 46, drives the shutter disc 64 at a constant speed through the large, fixed axis, shutter disc idler gear 94 which meshes with shutter disc gear 88 affixed to shutter disc 64. The drive gear 152 also drives the butterfly blade 70 through a differential gear train comprising gears 152, 150, 148 and 96 which are mounted as a variable quadrilateral with one gear at each corner. By compressing or expanding the short diagonal axis of this quadrilateral, which, of course, expands or compresses the longer diagonal axis, gear 96 will rotate with respect to coaxial gear 94. Thus, if all these gears are rotating at a uniform speed, any change in distance between axles 76 and 154 will result in gear 96 changing its position by a few teeth relative to gear 94.

In normal operation, the shutter disc 64 and butterfly blade 70 are both driven by drive gear 152 at the same speed through their respective gears. The shutter disc 64 is driven for example, at 500 r.p.m. by a 400 c.p.s., 117 volt motor, geared down from 10,500 r.p.m. This gearing can be variable or motor speed can be adjustable as desired. The butterfly blade 70 covers the sector cut 66 in shutter disc 64, and is equally spaced over the cut 66. The movable lever arm 118 is held by the solenoid latch 120 in this condition. To effect an exposure, the sector cut 66 is uncovered partly or all the way by moving the cover vane of butterfly blade 70 to one side so that a slit of predetermined angular width can sweep the aperture in diaphragm A positioned just behind the shutter disc 64. The slit width is established by the contact position of the linear cam 136 relative to the tip of the set screw 132 near the latching end of lever arm 118. The position of the linear cam 136 is adjusted by the D.C. motor 48 which can be controlled by an electronic system described later.

The A.C. motor 46 drives the harmonic cam 130 as well as the commutator 74. The harmonic cam 130 and the commutator 74 are set on drive shaft 76 in a particular relative position for synchronizing system motion. An electrical pulse which is applied to the solenoid latch 120 operates the shutter mechanism whenever an exposure is to be made. An electrical circuit which can be used to control shutter operation will be shown and described subsequently. The orientation of the harmonic cam 130 is such that the lever arm 118 is raised slightly off the catch of solenoid latch 120 before a pulse is applied to the solenoid. The catch can then be pulled back easily and with certainty to permit the lever arm 118 to be driven forward by the precompressed spring 124 as the harmonic cam 130 is moved away from roller bearing 128.

The lever arm 118 will move an amount determined by the setting of the linear cam 136 against a point on which the tip of set screw 132 will be stopped. The linear cam 136 can be rotated to any position within a 270 degree range by the D.C. motor 48. The movement of lever arm 118 compresses the short diagonal axis of the quadrilateral formed by the differential gear train including gears 152, 150, 148 and 96. The movement of axle 154 toward the fixed drive shaft 76 causes the butterfly blade 70 to move relative to the shutter disc 64 by the transferred motion of movable gears 150 and 148, and uncover the sector cut 66 with a slit whose width is dependent upon the setting of linear cam 136. The spring loaded lever arm 118 rolls smoothly down the contoured side of the harmonic cam 130 on roller bearing 128 as the cam 130 rotates and no reaction shock or vibration occurs. This cam 130 is profiled so that all differential movement between butterfly blade 70 and shutter disc 64 is completed before the split opening reaches the optical path.

After the trailing edge of the slit opening has passed the far extreme of the optical path (of the diaphragm aperture), the harmonic cam 130 begins pushing the lever arm 118 outwards, expanding the short axis of the differential gear train quadrilateral, slowing down and restoring the butterfly blade 70 to its original position relative to shutter disc 64. The spring 124 is compressed in the process, and the lever arm 118 is pushed past the spring loaded catch of solenoid latch 120, which subsequently holds the lever arm 118 until another pulse is applied to energize the solenoid.

Figure 9:
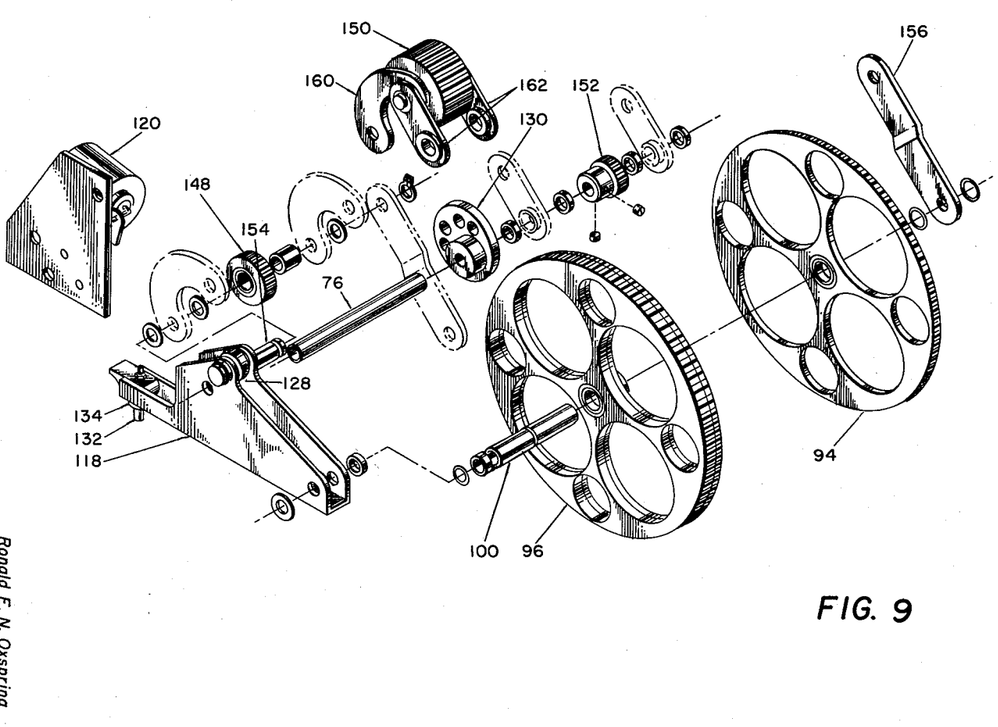
FIGURE 9 is an exploded perspective of the main drive mechanism for the shutter.
Figure 10:
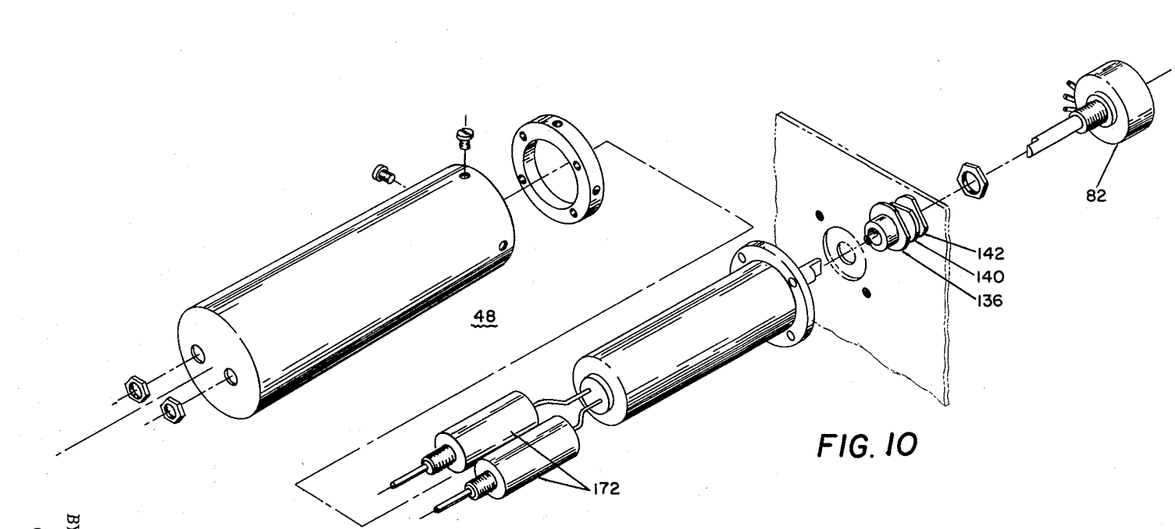
FIGURE 10 is another exploded perspective illustrating construction of slit width control elements for the shutter.

Electrical components including relays K1 and K2 are mounted within the shutter housings as shown in FIGURE 5, and the D.C. motor 48 can be an assembly which is understood to include filters 172 in the power lines to the motor. FIGURE 9 is an exploded view generally of the shutter gearing mechanism. The shutter disc 64 is driven by the large gear 94 and the butterfly blade 70 is driven by the large gear 96. The A.C. motor 46 (not shown) couples with drive shaft 76. Spacers, washers, set screws, etc. are clearly shown here, and the different elements previously described are identified by their particular reference numbers. FIGURE 9 is intended to doubly clarify the construction of the main parts of shutter mechanism and it is not believed that a detailed description of FIGURE 9 is necessary. The same holds true for the exploded perspective of FIGURE 10, which is also intended to doubly clarify the slit width control mechanism. Elements shown in phantom lines (FIGURE 9) are repeated views of a corresponding element in solid lines, to clarify assembly arrangements.

Figure 11:
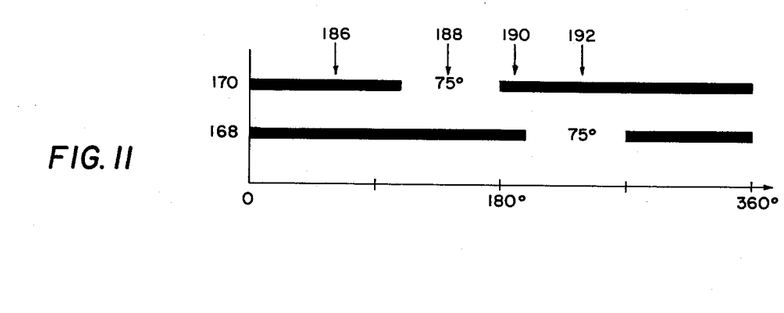
FIGURE 11 is a graph illustrating commutator operation in the shutter.
Figure 12:
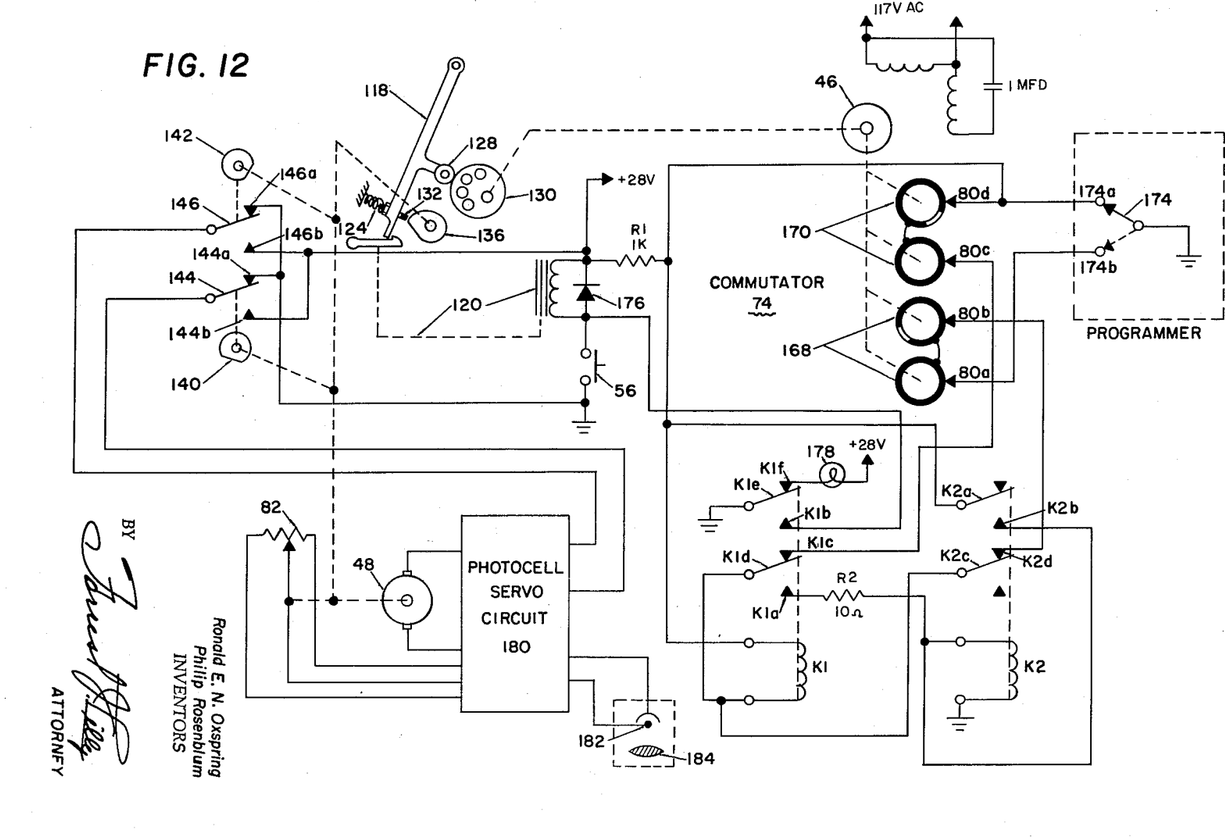
FIGURE 12 is a circuit diagram of a preferred control circuit for the shutter.

FIGURE 11 is a graph which illustrates commutator 74 action and will be described together with the general electrical control circuit for the shutter shown in FIGURE 12. The slip rings 168 and 170 of commutator 74 driven by the A.C. motor 46 are schematically shown in FIGURE 12 as two pairs of rings, each pair being electrically connected together by a jumper wire. The brushes are labeled 80a, 80b, 80c and 80d and ride on the four rings, one to a ring. The pairs of rings 168 and 170 are simply synchronized switches. The circuit between brushes 80c and 80d is broken for 75 degrees out of every 360 degrees revolution of the commutator 74 and the circuit between brushes 80a and 80b is also broken 75 degrees every revolution of the commutator 74. The circuit between brushes 80a and 80b, however, is broken 15 degrees after the circuit between brushes 80c and 80d is closed. This is illustrated by the bar graph of FIGURE 11. The bar labeled 168 represents the action of slip ring 168 and the bar labeled 170 represents the action of slip ring 170. A break in a bar represents a break in the circuit, or opening of the commutator "switch." Of course, the ends of the two bars are joined to their respective beginnings and are not to be considered breaks. It is noted that there is an overlapping section of 15 degrees between breaks wherein both commutator "switches" are closed.

Operation of the shutter for an exposure can be effected by energization of the solenoid latch 120 by an electrical pulse. The electrical pulse in this instance is governed by the switching action of a programmer switch 174 connected to ground. The programmer switch 174 is moved from contact 174a to 174b and back to 174a to cause energization of solenoid latch 120. This switching action in normal operation can produce a ground pulse of approximately 0.2 to 0.4 second. Since the shutter disc 64 is rotated at 500 r.p.m., a single shutter operation takes about 0.1 second. The commutator 74 and relays K1 and K2 are employed to prevent overlapping or double exposures.

One end of the coil of solenoid latch 120 is connected to +28 volts D.C. and the other end can be connected to ground through pushbutton switch 56 for test purposes. A rectifier diode 176 is connected across the solenoid coil as shown to absorb inductive "kick-back" energy of the coil. Normally, the pushbutton switch 56 is not in use, and the latter end of the solenoid coil connecting with the anode of diode 176 which connects with relay contact K1b, can be grounded through pole K1e when relay K1 is energized.

A resistor R1 connects +28 volts D.C. to brush 80d and programmer switch contact 174a. This resistor R1 also connects the +28 volts D.C. to pole K2a and to the upper end of the control coil of relay K1. Contact K2b is connected to one end of the control coil of relay K2, the other end of which is grounded, and to contact K1a through a resistor R2. The brush 80d can be connected through commutator switch 170 to brush 80c which is connected to contact K1c. Lower relay poles K1d and K2c are both connected to the lower end of the control coil of relay K1. The brush 80a is connected to programmer switch contact 174b and brush 80a can be connected through commutator switch 168 to brush 80b which is connected to contact K2d of relay K2. Upper relay pole K1e is grounded, and contact K1f is connected to +28 volts D.C. through indicator lamp 178. This lamp 178 is normally lit steadily and goes off momentarily to indicate visually to an observer that an exposure (shutter operation) was made. Of course, a recorder can be substituted for lamp 178, each negative pulse representing an exposure. Similarly, an electronic counter which is responsive to a negative impulse can be provided in this circuit to record the number of exposures made.

The positioning of linear cam 136 is controlled by a photocell servo circuit 180 which is shown in detail by FIGURES 13 and 14, and will be fully described later. A photocell 182, together with a suitable focusing optical element 184 to view and sense the brightness of an object or area to be photographed, governs the positioning of linear cam 136, including cams 140 and 142, through the D.C. motor 48 by the photocell servo circuit 180. Potentiometer 82 is actually a part of the servo circuit.

The limit switches 144 and 146 also connect with the photocell servo circuit 180 as indicated in FIGURE 12. Limit switch contacts 144a and 146a are connected to ground and contacts 144b and 146b are both connected to +28 volts D.C. Switch 144 connects with +28 volts D.C. when the flat portion of cam 140 reaches a position to actuate the switch 144 to contact 144b. Similarly, the switch 146 is connected to +28 volts D.C. when cam 142 is rotated to a position where the flat portion of the cam 142 actuates the switch 146 to lower contact 146b. An angular range of, for example, 270 degrees is available between the two limits set by the flats on cams 140 and 142.

The A.C. motor 46 also drives the harmonic cam 130 which works with the roller bearing 128 on spring-loaded lever arm 118. The set screw 132 when stopped against a point on linear cam 136, limits the movement of lever arm 118. When the harmonic cam 130 raises the end of lever arm 118 off the solenoid catch, the solenoid latch 120 is energized, pulling the catch away to permit the roller bearing 128 to roll down the side of harmonic cam 130 without shock or effort. Shock due to the reaction of change of motion of the butterfly blade 70 through the gear train is absorbed by the large and relatively heavy shutter disc 64 which behaves like a flywheel. The reaction of the change of motion of the light butterfly is balanced by an opposing change of motion of a much heavier rotating assembly (including shutter disc, gears and lever arm) which has a substantial flywheel effect. This, coupled with a harmonic cam profile to spread this action over as long a time interval as possible provides a "shockless" shutter. It should be noted that the spring 124 can be connected across the differential itself, between axles 76 and 154 (gears 152 and 148 floating) and using gear 150 as the fixed axis drive gear, to provide an exceptionally shockless shutter. The lever arm 118 is re-latched after an exposure by the profiling of the harmonic cam 130 which pushes the lever arm 118 back against spring 124 past the catch of the solenoid latch 120.

The operation of the circuit of FIGURE 12 can be described with reference to the graph of FIGURE 11. For any particular shutter operation, the linear cam 136, which is positioned by D.C. motor 48 and photocell servo circuit 180, can be considered to be fixed in some instantaneous position since the brightness of an average object area changes very little, if at all, during a shutter operation which is extremely fast comparatively, and any variation of brightness cannot be reflected in the system in an operation.

When programmer switch 174 is connected to contact 174a, as shown, the upper end of the control coil of relay K1 is connected to ground continuously, and the lower end of the coil of relay K1 is either grounded through switch 170 and relay contact K1c and pole K1d, or is simply disconnected when switch 170 opens. The path through switch 168 and relay contact K2d and pole K2c is always open for the switch 174 position with contact 174a shown, such that relay K1 cannot become energized and thus, in turn, energize the control coil of relay K2 to complete the circuit for the coil of solenoid latch 120 for any commutator 74 orientation. If programmer switch 174 is actuated to connect with contact 174b at a time when the commutator brushes have a relative slip ring position as indicated by arrow 186 in FIGURE 11, the ground is removed from brush 80d at that moment, and connected to brush 80a for, say, 0.2 second. Switch 168 and switch 170 are closed as indicated by the bars in FIGURE 11. The ground connection provided through programmer switch 174 and contact 174b is applied to both ends of the control coil of relay K1 in the following paths. First, a ground to the lower end of the control coil of relay K1 is applied through switch 168, contact K2d and pole K2c. Second, and continuing the first path on through pole K1d, contact K1c, switch 170 and back around to the upper end of the K1 coil, the upper end of the K1 coil is also grounded. Thus, the coil of solenoid latch 120 cannot be energized for this type of commutator orientation.

At an instantaneous commutator 74 orientation corresponding to arrow 188, the switch 170 is open but switch 168 is closed. Since brush 80a is connected to ground through contact 174b and switch 174, the only difference for the condition corresponding to commutator 74 orientation indicated by arrow 186, is that the open switch 170 removes the ground from the upper end of the relay K1 coil. As a result, +28 volts D.C. is applied to relay K1 coil through resistor R1 and to ground through pole K2c, contact K2d, closed switch 168 and switch 174 connecting contact 174b to ground. Pole K1d accordingly is actuated to contact K1a, and pole K1e to contact K1b. Since switch 168 is closed, pole K1d only connects a ground to the upper end of the coil of relay K2 through contact K1a and resistor R2. The pole K1e, however, broke the circuit of indicator lamp 178 causing it to go out when pole K1e connected a ground to contact K1b and the lower end of the coil of solenoid latch 120. This energizes the solenoid latch 120 which releases lever arm 118 to permit a shutter operation. The harmonic cam 130 raises lever arm 118 to a peak point slightly off the catch of solenoid latch 120 at the moment that commutator switch 170 opens (commutator switch 168 being closed). The harmonic cam 130 can be simply an eccentric circular disc for producing uniform deceleration of the butterfly blade 70. It should also be noted that the linear cam 136 has a helix profile which produces an equal linear rise of set screw 132 for each degree of rotation of the cam 136. Displacement of the tip of set screw 132 from the center of rotation of the linear cam 136 plotted against angular rotation of the cam 136 yields a straight line.

The commutator 74 continues to rotate until an orientation corresponding to arrow 190 (FIGURE 11) is reached, which is a condition similar to that of arrow 186 when switch 170 closes. However, commutator rotation is fast enough such that relay K1, which has a relatively large drop-out time, does not become de-energized as may be expected, in the narrow overlapping interval before switch 168 opens and commutator rotation continues to a position as represented by the arrow 192, when switch 168 is opened, removing the ground from the lower end of relay K1 coil. This, of course, energizes relay K2 through resistor R2 and pole K1d still making with contact K1a. The relay K2, when energized, breaks the circuit from the lower end of the coil of relay K1 to switch 168 and applies +28 volts D.C. through resistor R1, pole K2a and contact K2b to the coil of relay K2 to hold the relay K2 energized, until switch 174 returns to contact 174a to provide a ground to the upper end of the control coil of still energized relay K2, de-energizing it. At the same time, when pole K2a makes with contact K2b, and with pole K1d still connected to contact K1a, the current limiting resistor R2 is effectively connected across the coil of relay K1, de-energizing it. Solenoid latch 120 is accordingly de-energized too, but since relay K2 remains energized until switch 174 returns to contact 174a, breaking the ground circuit for the coil of K1, double exposures due to a long ground pulse is prevented.

Figure 13:
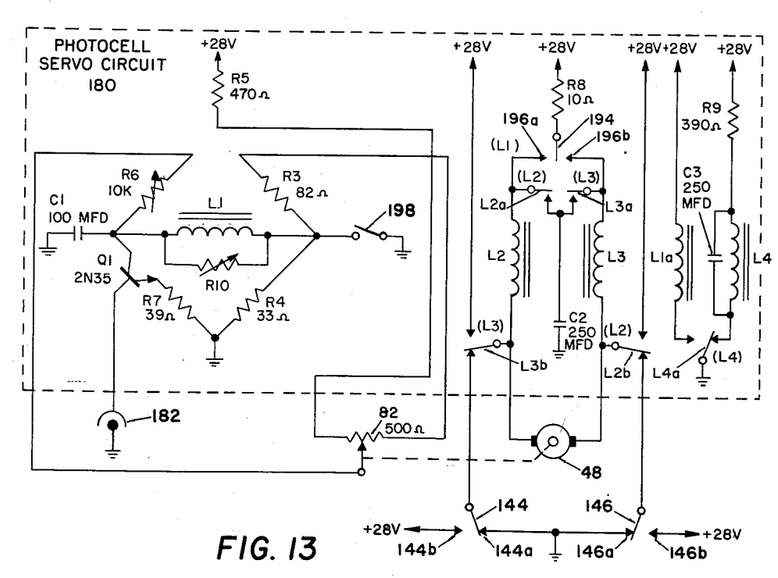
FIGURE 13 is a circuit diagram of a preferred photocell servo circuit.
Figure 14:
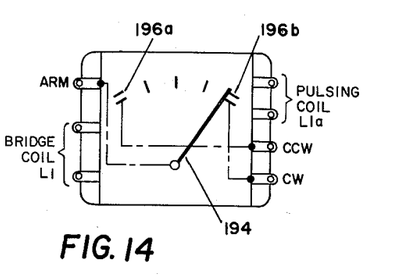
FIGURE 14 is a diagrammatic drawing of a control unit in the photocell servo circuit.

The photocell servo circuit 180 is shown in FIGURE 13. One of the main components of this circuit is a three position, single pole relay such as a 20–0–20 microampere Weston Sensitrol, for example. A diagrammatic drawing of the unit is illustrated in FIGURE 14. An arm 194 is normally centered between two small magnetic contacts 196a and 196b. Bridge coil L1 is connected between the centers of a bridge circuit to detect bridge unbalance, and a pulsing coil L1a is provided to periodically return the arm 194 back to its center position from the small magnetic contacts, 196a or 196b, to sample bridge unbalance every second or so.

The bridge coil L1 is shown connected between the centers of a bridge circuit in FIGURE 13, and +28 volts D.C. is applied through resistor R5 across the ends of the bridge. The left branch of the bridge includes resistor R6 in the upper leg, and a transistor Q1 in series with a resistor R7 in the lower leg. The right branch of the bridge includes resistance of potentiometer 82 in series with resistor R3 in the upper leg, and a resistor R4 in the lower leg. An adjustment resistor R10 is connected across the bridge coil L1, capacitor C1 connects the left branch center to ground, and switch 198 connects the right branch center to ground. Capacitor C1 is simply a stabilizing capacitance and switch 198 is only closed for test purposes to unbalance the bridge strongly.

The output of photocell 182 is fed to the base of transistor Q1, the collector of which is connected to the left branch center and the emitter connected to resistor R7. For decreasing brightness sensed by the photocell 182, for example, the transistor Q1 resistance varies such that the potential of the left branch center rises with respect to the right branch center. Current will flow through L1 from left to right for this circuit condition. Increasing brightness sensed by the photocell 182, of course, results in current flowing through L1 from right to left, until equilibrium is again obtained by proper positioning of the wiper of potentiometer 82 by D.C. motor 48 to rebalance the bridge.

The arm 194 is connected to +28 volts through resistor R8. Contact 196a is connected to the left hand brush of the motor 48 through the control coil of relay L2 and contact 196b is connected to the right hand brush of D.C. motor 48 through the coil of relay L3. Relays L2 and L3 are double pole, double throw relays. Pole L2a is connected to the upper end of coil L2 and pole L3a is connected to the upper end of coil L3. Pole L3b is connected to the left brush of D.C. motor 48 and pole L2b is connected to the right brush of D.C. motor 48. The upper contacts for pole L3b and pole L2b are connected to +28 volts and the lower contacts for pole L3b and pole L2b are respectively connected to limit switches 144 and 146. Both contacts for poles L2a and L3a are connected to ground through capacitor C2.

For current in coil L1 going from left to right, the arm 194 is moved to contact 196a, for example, and current from resistor R8 will flow through coil L2, pole L3b and the lower contact thereof, limit switch 144 to ground, energizing relay L2. Pole L2a is then connected to ground through capacitor C2 and pole L2b is actuated to its upper contact. Since current flowing in an inductance, coil L2, cannot change instantaneously, relay L2 remains energized during the initial surge through capacitor C2. This applies +28 volts to D.C. motor 48 from the right brush to pole L3b and its lower contact to ground through limit switch 144. D.C. motor 48 is accordingly energized to reposition the wiper of potentiometer 82 to rebalance the bridge. The pulsing coil L1a periodically returns arm 194 to center position where it remains if circuit equilibrium (bridge balanced and no current flows in coil L1) has been established. The charge on capacitor C2 will keep relay L2 energized during this pulsing interval. If the bridge has been rebalanced, the arm 194 stays in its center position and relay L2 becomes de-energized. A similar circuit behavior occurs if current flows from right to left through coil L1, except, of course, arm 194 will make with contact 196b and relay L3 is energized such that +28 volts is applied to D.C. motor 48 from the left brush on through limit switch 146 to ground. D.C. motor 48 is then rotated in a reverse direction than before to adjust the wiper of potentiometer 82 for bridge rebalance.

When either limit switch 144 or 146 is actuated through over-run, the D.C. motor 48 is de-energized and then re-energized (reversed) to return the wiper of potentiometer 82 (and the actuated limit switch) back into working range. For example, assuming relay L2 is energized such that pole L2b is actuated to its upper contact, and then limit switch 144 is actuated to contact 144b through over-run +28 volts will be applied to both sides of D.C.

motor 48 to stop the motor. The +28 volts from actuated limit switch 144 also de-energizes relay L2, and pole L2b returns to its lower contact and to ground through limit switch 146 and contact 146a. D.C. motor 48 is thus reversed and energized until limit switch 144 is returned to contact 144a and ground.

The contacts 196a and 196b are small magnets and a pulsing coil L1a is necessary to periodically move the arm 194 back to its center position so that arm 194 will then be driven in a direction according to the instantaneous direction of current flow through coil L1. The pulsing coil L1a connects +28 volts to the contact of a single pole, double throw relay L4. The pole L4a of relay L4 is connected to ground, and a capacitor C3 is connected across the control coil of L4, as shown in FIGURE 13. The upper end of the coil L4 is connected to +28 volts through a resistor R9. The coil L4 is energized gradually with pole L4a spring-loaded to its right contact, as the voltage across capacitor C3 builds up in the R-C circuit including resistor R9. When sufficient voltage is built up across coil L4, pole L4a is actuated to its left contact, energizing the pulsing coil L1a which returns the arm 194 back to its center position from one of the small magnetic contacts 196a or 196b. Capacitor C3 quickly discharges through coil L4 to return pole L4a back to its original position, and the cycle is started over again. It is apparent that the pulsing rate can be easily varied by varying the value of resistor R9 and/or capacitor C3.

Although dimensions, component types and values have been indicated in the description and drawings, specific values and data are given as examples only, and do not necessarily restrict or limit the scope of our invention. The data is only intended to provide an example of a satisfactory working model. It is to be understood that the particular embodiment of the invention described above and shown in the drawings is merely illustrative of and not restrictive of the broad invention, and that various changes in design, structure and arrangement may be made without departing from the spirit and scope of the broader of the appended claims.

We claim:

1. Shutter mechanism, comprising: an opaque shutter member having a transmissive area therein; means for continually rotating said shutter member on an axis perpendicular to a plane including the transmissive area at a constant speed; an opaque cover member for covering the transmissive area and adapted to rotate freely with respect to said shutter member on the same axis; differential gearing driven by said rotating means and arranged in a configuration for rotating said cover member in synchronism with said shutter member, said differential gearing including a differential gear train arranged in a variable quadrilateral with a gear mounted at each corner, an input end gear of the train being adapted to be rotated at a constant speed and mounted in a plane for engaging means for driving said shutter member, and an output end gear of the train being mounted in a plane for engaging a gear connected to drive said cover member in synchronism with said shutter member, the quadrilateral having diagonal axes which can be compressed and expanded to further rotate the gear connected to drive said cover member an amount whereby the relative angular position of said cover member to said shutter member can be changed; and means for varying the configuration of the arrangement of said differential gearing for moving said cover member relative to said shutter member, to uncover at least a part of the transmissive area for a predetermined portion of at least one revolution.

2. Shutter mechanism, comprising: an opaque shutter member having a transmissive area therein; means for rotating said shutter member on an axis perpendicular to a plane including the transmissive area; an opaque cover member for covering the transmissive area and adapted to rotate freely with respect to said shutter member on the same axis; differential gearing driven by said rotating means and arranged in a configuration for rotating said cover member in synchronism with said shutter member, said differential gearing including a differential gear train arranged in a variable quadrilateral with a gear mounted at each corner, an input end gear of the train being adapted to be rotated at a constant speed and mounted in a plane for engaging means for driving said shutter member, and an output end gear of the train being mounted in a plane for engaging a gear connected to drive said cover member in synchronism with said shutter member, the quadrilateral having diagonal axes which can be compressed and expanded to further rotate the gear connected to drive said cover member an amount whereby the relative angular position of said cover member to said shutter member can be changed; and means for varying the configuration of the arrangement of said differential gearing for angularly moving said cover member relative to said shutter member, to uncover at least a part of the transmissive area for a predetermined portion of at least one revolution, said differential varying means including adjustable means for regulating angular movement of said cover member relative to said shutter member in uncovering the transmissive area to an amount linearly proportional to amount of adjustment of said adjustable means.

3. The invention according to claim 2 including, in addition, photosensitive means for sensing the brightness of a viewed scene and providing an output signal proportional to the sensed brightness, and means responsive to the output signal of said photosensitive means for adjusting said adjustable means and regulating the amount of movement of said cover member relative to said shutter member according to the output of said photosensitive means.

4. The invention according to claim 3 wherein said means responsive to the output signal of said photosensitive means includes control circuitry for periodically sampling the output of said photosensitive means at a pulsing rate.

5. Shutter mechanism, comprising: an opaque shutter disc having a transmissive sector therein, said shutter disc being adapted to be continually rotated on a central axis perpendicular to said shutter disc at a constant speed; an opaque butterfly blade having a sector shaped cover vane for covering the transmissive sector and adapted to rotate freely with respect to said shutter disc on the same central axis; means for rotating said butterfly blade in synchronism with said shutter disc, said rotating means including a differential gear train arranged in a variable quadrilateral with a gear mounted at each corner, an input end gear of the train being adapted to be rotated at a constant speed and mounted in a plane for engaging means for driving said shutter disc, and an output end gear of the train being mounted in a plane for engaging a gear connected to drive said butterfly blade in synchronism with said shutter disc, the quadrilateral having diagonal axes which can be compressed and expanded to further rotate the gear connected to drive said butterfly blade an amount whereby the relative angular position of said butterfly blade to said shutter disc can be changed; and means for varying said rotating means for moving said butterfly blade relative to said shutter disc, to uncover at least a part of the transmissive sector for a predetermined portion of at least one revolution.

6. The invention according to claim 5 wherein said means for varying said rotating means includes a spring-loaded lever arm connected to compress a diagonal axis of the variable quadrilateral, latch means for holding said spring-loaded lever arm in a reference position in which the cover vane of said butterfly blade covers the transmissive sector of said shutter disc fully, means for restraining travel distance of said lever arm from the reference position when released, and means for re-positioning said lever arm to the reference position.

7. A camera shutter, comprising: an opaque shutter disc having a transparent sector therein; means for continually rotating said shutter disc on a central axis perpendicular to said shutter disc at a constant speed; an opaque butterfly blade having a sector shaped cover vane for covering the transparent sector and adapted to rotate freely with respect to said shutter disc on the same central axis; differential gearing driven by said rotating means and arranged in a configuration for rotating said butterfly blade in synchronism with said shutter disc, said differential gearing including a differential gear train arranged in a variable quadrilateral with a gear mounted at each corner, an input end gear of the train being adapted to be rotated at a constant speed and mounted in a plane for engageing means for driving said shutter disc, and an output end gear of the train being mounted in a plane for engaging a gear connected to drive said butterfly blade, the quadrilateral having diagonal axes which can be compressed and expanded to further rotate the gear connected to drive said butterfly blade an amount whereby the relative angular position of said butterfly blade to said shutter disc can be changed; and means for varying the configuration of the arrangement of said differential gearing for angularly moving said butterfly blade relative to said shutter disc, to uncover at least a part of the transparent sector for a predetermined portion of at least one revolution, said differential varying means including a spring-loaded lever arm connected to compress a diagonal axis of the variable quadrilateral, latch means for holding said spring-loaded lever arm in a reference position in which the cover vane of said butterfly blade covers the transparent sector of said shutter disc fully, means for restraining travel distance of said lever arm from the reference position when released, and means for re-positioning said lever arm to the reference position.

8. The invention according to claim 7 including, in addition, photosensitive means for sensing the brightness of a viewed scene and providing an output signal proportional in magnitude to the sensed brightness, and means responsive to the output signal for regulating said differential varying means whereby the amount of angular movement of said butterfly blade relative to said shutter disc in uncovering the transparent sector is linearly varied inversely proportional to the magnitude of the output signal of said photosensitive means.

9. The invention according to claim 7 wherein said restraining means includes a linear cam having a profile for engaging a point of said lever arm when released, said linear cam being variable in position for regulating the released travel distance of said lever arm, whereby the amount of movement of said butterfly blade relative to said shutter disc can be controlled.

10. The invention according to claim 7 wherein said re-positioning means includes a harmonic cam adapted to be driven in synchronism with said shutter disc and engaging said lever arm, said harmonic cam being profiled to raise said lever arm slightly off said latch means at a peak point, whereby said latch means can be actuated at such point with ease and certainty.

11. The invention according to claim 10 wherein said latch means includes a solenoid latch, said solenoid latch being operatively responsive to an electrical pulse, and including, in addition, an electrical control circuit for generating the electrical pulse and energizing said solenoid latch when said lever arm is raised off said latch means for an exposure by said camera shutter.

References Cited in the file of this patent

UNITED STATES PATENTS

| | | |
|---|---|---|
| 1,884,605 | Dina | Oct. 25, 1932 |
| 2,045,260 | Berggren | June 23, 1936 |
| 2,179,718 | Fedotoff | Nov. 14, 1939 |
| 2,226,245 | Kende | Dec. 24, 1940 |
| 2,274,707 | Kende | Mar. 3, 1942 |
| 2,347,699 | Magnus et al. | May 2, 1944 |
| 2,347,700 | Aronoff | May 2, 1944 |
| 2,376,300 | Widmer | May 15, 1945 |
| 2,391,377 | Aiken | Dec. 25, 1945 |
| 2,429,972 | Aiken | Nov. 4, 1947 |
| 2,653,507 | Riles | Sept. 29, 1953 |
| 2,764,056 | Kennedy | Sept. 25, 1956 |
| 2,788,704 | Habig | Apr. 16, 1957 |
| 2,841,064 | Bagby et al. | July 1, 1958 |
| 2,858,750 | Farinet | Nov. 4, 1958 |